(12) United States Patent
Sakazaki et al.

(10) Patent No.: US 10,247,243 B2
(45) Date of Patent: Apr. 2, 2019

(54) ROLLING BEARING DEVICE

(71) Applicant: JTEKT CORPORATION, Osaka-shi, Osaka (JP)

(72) Inventors: Tsukasa Sakazaki, Kizugawa (JP); Yoshimichi Higashiyama, Kashihara (JP); Masami Naka, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/816,274

(22) Filed: Nov. 17, 2017

(65) Prior Publication Data

US 2018/0149202 A1    May 31, 2018

(30) Foreign Application Priority Data

Nov. 30, 2016  (JP) ................. 2016-232224

(51) Int. Cl.
  *F16C 19/06*    (2006.01)
  *F16C 19/16*    (2006.01)
  *F16C 33/66*    (2006.01)
  *F16C 41/00*    (2006.01)

(52) U.S. Cl.
  CPC .......... *F16C 33/6674* (2013.01); *F16C 19/06* (2013.01); *F16C 19/163* (2013.01); *F16C 33/6659* (2013.01); *F16C 41/002* (2013.01); *F16C 2322/39* (2013.01)

(58) Field of Classification Search
  CPC ................ F16C 33/334; F16C 33/6655; F16C 33/6659; F16C 33/6674
  See application file for complete search history.

(56) References Cited

U.S. PATENT DOCUMENTS

| 7,832,937 B2* | 11/2010 | Suzuki | ............... F16C 33/6674 184/11.2 |
| 7,883,271 B2* | 2/2011 | Suzuki | ............... F16C 33/3856 384/462 |
| 8,403,110 B2* | 3/2013 | Suzuki | ................. B23Q 11/123 184/6.26 |
| 2006/0165328 A1 | 7/2006 | Ueno et al. | |

FOREIGN PATENT DOCUMENTS

JP    2004-108388 A    4/2004

* cited by examiner

*Primary Examiner* — James Pilkington
(74) *Attorney, Agent, or Firm* — Oliff PLC (57) ABSTRACT

A rolling bearing device includes a bearing portion and an oil supply unit provided adjacent, in the axial direction, to an annular space between an inner ring and an outer ring of the bearing portion to supply lubricating oil to the annular space. The oil supply unit includes an oil chamber that accommodates lubricating oil, a nozzle that discharges lubricating oil in the oil chamber, a pump body that applies a discharge force for causing lubricating oil in the oil chamber to fly from the nozzle toward the annular space, and a detection portion that detects gathering of lubricating oil at a discharge port of the nozzle. The detection portion includes a pair of electrodes disposed with the discharge port of the nozzle interposed therebetween, and a measurement portion that measures the capacitance of the pair of electrodes.

4 Claims, 6 Drawing Sheets

FIG.6

ROLLING BEARING DEVICE

INCORPORATION BY REFERENCE

The disclosure of Japanese Patent Application No. 2016-232224 filed on Nov. 30, 2016 including the specification, drawings and abstract, is incorporated herein by reference in its entirety.

BACKGROUND OF THE INVENTION

1. Field of the Invention

The present invention relates to a rolling bearing device that includes an oil supply unit.

2. Description of the Related Art

In recent years, various types of machine tools are requested to increase the speed of a main spindle in order to improve the processing efficiency and the production efficiency. When the main spindle is rotated at a high speed, the lubricating property of a bearing portion that supports the main spindle is particularly important. Therefore, there is proposed a rolling bearing device that includes an oil supply unit configured to supply lubricating oil and provided adjacent to a bearing portion in the axial direction (see Japanese Patent Application Publication No. 2004-108388 (JP 2004-108388 A)).

The oil supply unit described in JP 2004-108388 A includes a pump that discharges lubricating oil in an oil chamber from a nozzle and that supplies the lubricating oil to an annular space between an inner ring and an outer ring. In order to efficiently supply oil using such an oil supply unit, it is requested to supply a minute amount of lubricating oil that is necessary to lubricate the bearing portion at predetermined oil supply timings. To this end, it is conceivable to form the nozzle so as to have a very small inside diameter of several micrometers to several tens of micrometers, and to supply lubricating oil by causing a minute amount of lubricating oil to fly from the nozzle by actuating the pump.

In this case, however, a part of the lubricating oil which is discharged from the nozzle flies as oil droplets, but the remaining lubricating oil is occasionally gathered in a droplike form around a discharge port of the nozzle because of the surface tension of the lubricating oil. The lubricating oil which has been gathered may block the discharge port to cause clogging, and oil may not be supplied appropriately.

SUMMARY OF THE INVENTION

It is an object of the present invention to provide a rolling bearing device that includes an oil supply unit that can detect gathering of lubricating oil at a discharge port of a nozzle due to clogging etc.

An aspect of the present invention provides a rolling bearing device including: a bearing portion that has an inner ring, an outer ring, and a plurality of rolling elements interposed between the inner ring and the outer ring; and an oil supply unit provided adjacent, in an axial direction, to an annular space between the inner ring and the outer ring to supply lubricating oil to the annular space, in which: the oil supply unit includes an oil chamber that accommodates lubricating oil, a nozzle that discharges lubricating oil in the oil chamber, a pump body that applies a discharge force for causing lubricating oil in the oil chamber to fly from the nozzle toward the annular space, and a detection portion that detects gathering of oil at a discharge port of the nozzle; and the detection portion includes a pair of electrodes disposed with the discharge port of the nozzle interposed therebetween, and a measurement portion that measures a capacitance of the pair of electrodes.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
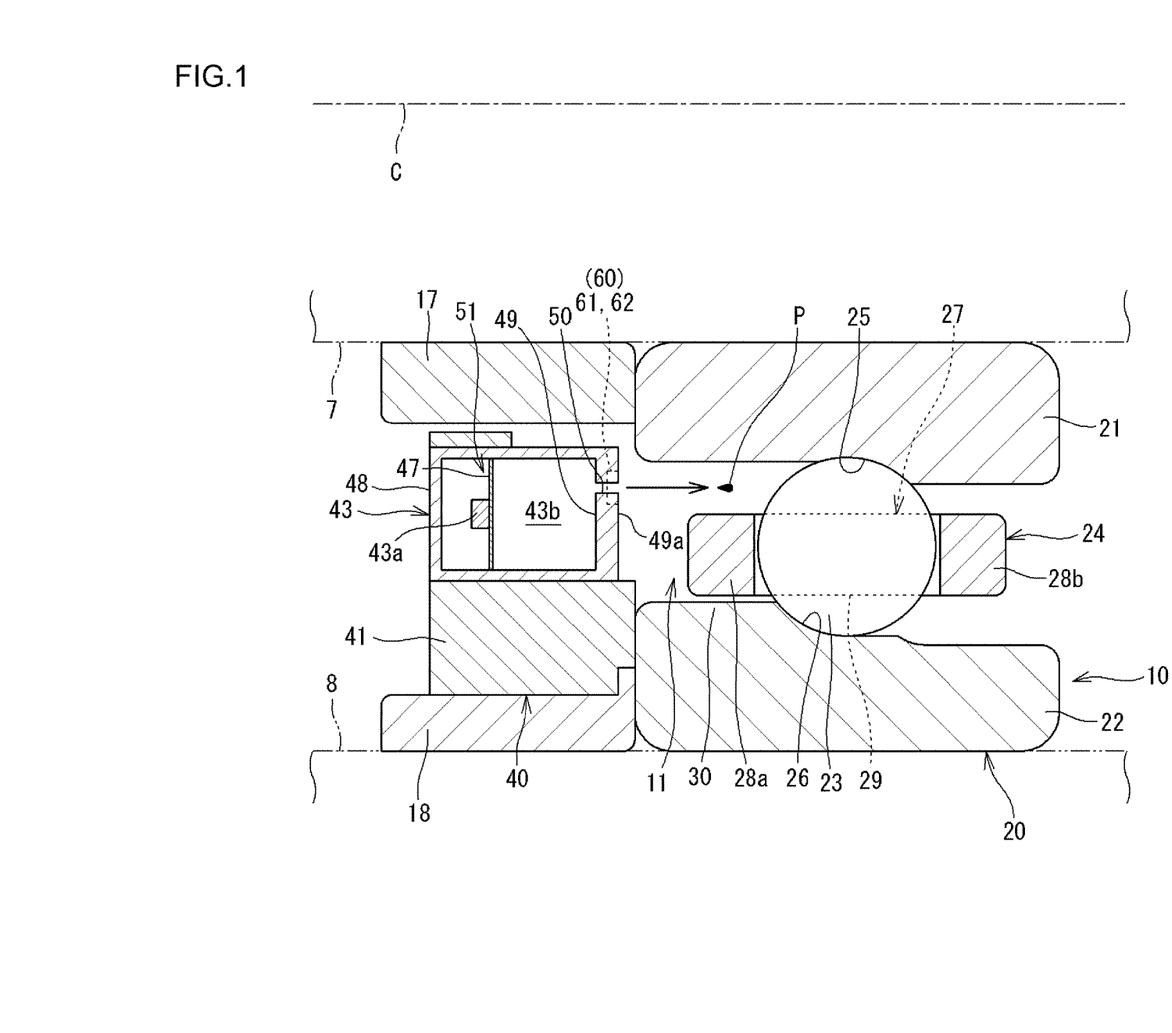
FIG. 1 is a sectional view illustrating a rolling bearing device according to an embodiment.

A rolling bearing device according to an embodiment of the present invention will be described below. FIG. 1 is a sectional view illustrating a rolling bearing device according to an embodiment. A rolling bearing device 10 rotatably supports a main spindle (shaft 7) of a main spindle device of a machine tool, and is housed in a housing 8 of the main spindle device. In FIG. 1, the shaft 7 and the housing 8 are indicated by the long dashed double-short dashed lines. In the following description, the direction which is parallel to a center line C of the rolling bearing device 10 is referred to as an "axial direction", and the direction which is orthogonal to the axial direction is referred to as a "radial direction". The rolling bearing device 10 is also applicable to devices other than machine tools.

The rolling bearing device 10 includes a bearing portion 20 and an oil supply unit 40. The bearing portion 20 has an inner ring 21, an outer ring 22, a plurality of balls (rolling elements) 23, and a cage 24 that holds the plurality of balls 23, and constitutes a ball bearing (rolling bearing). The rolling bearing device 10 further includes an inner ring spacer 17 and an outer ring spacer 18 in a cylindrical shape.

In the embodiment, the outer ring 22, the outer ring spacer 18, and the oil supply unit 40 are attached to the bearing housing 8 so as not to be rotatable. The inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member that is externally fitted with the shaft 7. A raceway (hereinafter referred to as an "inner ring raceway 25") is formed on the outer periphery of the inner ring 21. In the embodiment, the inner ring 21 and the inner ring spacer 17 are separate from each other. However, the inner ring 21 and the inner ring spacer 17 may be integral (inseparably integral) with each other.

The outer ring 22 is a cylindrical member fixed to the inner peripheral surface of the bearing housing 8. A raceway (hereinafter referred to as an "outer ring raceway 26") is formed on the inner periphery of the outer ring 22. In the embodiment, the outer ring 22 and the outer ring spacer 18 are separate from each other. However, the outer ring 22 and the outer ring spacer 18 may be integral (inseparably integral) with each other.

The balls 23 and the cage 24 are provided in an annular space 11 formed between the inner ring 21 and the outer ring 22. The balls 23 are interposed between the inner ring 21 and the outer ring 22, and rolled on the inner ring raceway 25 and the outer ring raceway 26.

The cage 24 has an annular shape as a whole, and has an annular portion 28a on one side, in the axial direction, of the balls 23, an annular portion 28b on the other side, in the axial direction, of the balls 23, and a plurality of cage bars 29 that couple the annular portions 28a and 28b to each other. Spaces between the annular portions 28a and 28b and between the cage bars 29 and 29 which are adjacent to each other in the circumferential direction serve as pockets 27. One ball 23 is housed in each of the pockets 27. With this configuration, the cage 24 can hold the plurality of balls 23 at intervals in the circumferential direction.

The annular portion 28a on one side (side of the oil supply unit 40), in the axial direction, of the cage 24 can be brought into slide contact with a shoulder portion 30 of the outer ring 22. Consequently, the cage 24 is positioned in the radial direction by the outer ring 22. That is, the cage 24 of the bearing portion 20 is guided by the outer ring (guided by the bearing ring). The cage 24 is made of a resin (e.g. a phenol resin), for example. The inner ring 21 and the outer ring 22 are made of steel such as bearing steel. The balls 23 may be made of steel such as bearing steel, or may be made of a ceramics.

Figure 2:
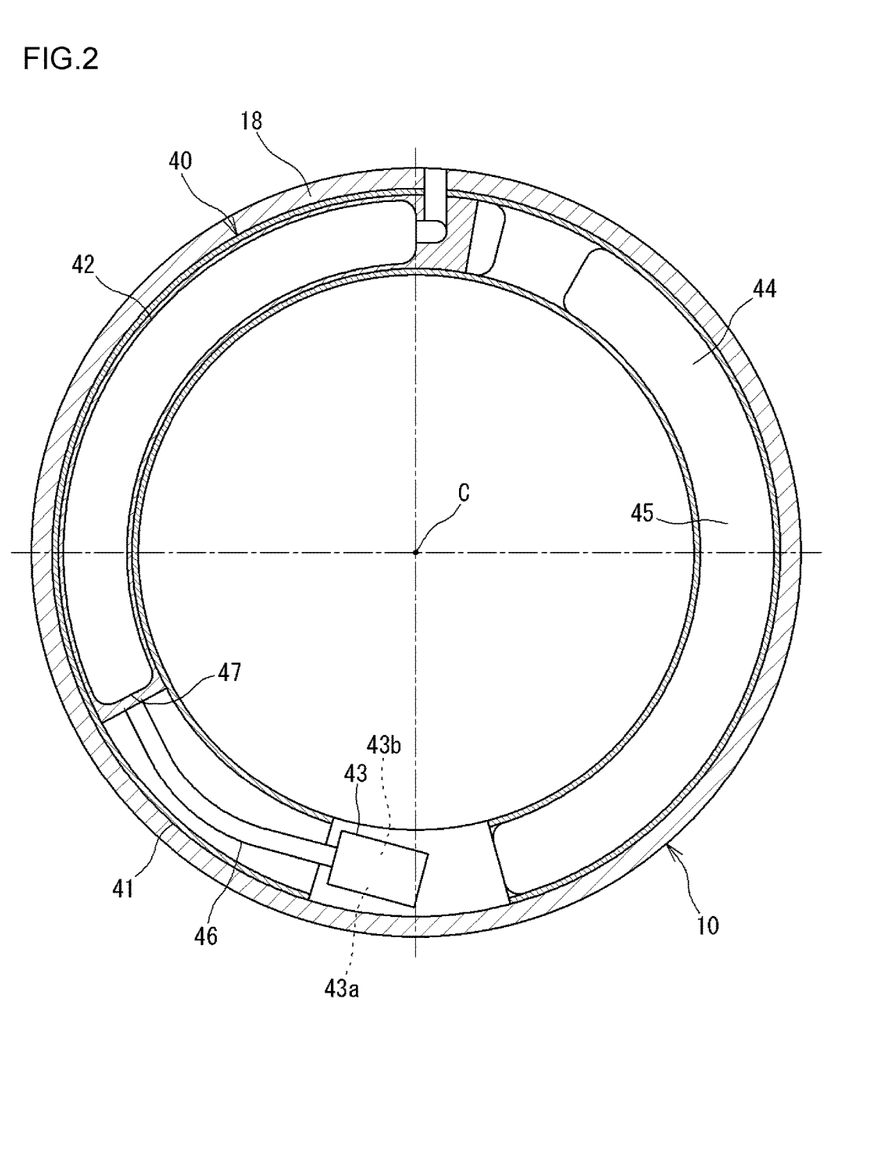
FIG. 2 is a cross-sectional view of an oil supply unit as seen in the axial direction.

FIG. 2 is a cross-sectional view of the oil supply unit 40 as seen in the axial direction. The oil supply unit 40 is formed in a circular ring shape as a whole. The oil supply unit 40 includes a tank 42 and a pump 43. The tank 42 and the pump 43 are provided in an annular body portion 41 of the oil supply unit 40. The oil supply unit 40 includes a control portion 44 and a power source portion 45, and further includes various sensors (not illustrated).

The body portion 41 is attached to the inner peripheral side of the outer ring spacer 18, and has a function as a frame that holds the pump 43 etc. The body portion 41 is a circular ring member, and is formed with internal spaces. The pump 43, the control portion 44, and the power source portion 45 are provided in the spaces. One of the spaces serves as the tank 42. Consequently, the oil supply unit 40 which includes the body portion 41, the tank 42, the pump 43, the control portion 44, the power source portion 45, etc. is constituted integrally.

In FIG. 2, the tank 42 stores lubricating oil (oil), and is connected to the pump 43 through piping 46 in order to cause the lubricating oil to flow to the pump 43. A holding material (porous member) that holds lubricating oil may be provided in the tank 42. Some or all of the tank 42, the control portion 44, and the power source portion 45 may be provided outside the rolling bearing device 10 (housing 8). In this case, such components are connected to the pump 43 etc. through piping and a communication line.

As illustrated in FIG. 1, the pump 43 includes a pump case 48 and a pump body 51. The pump body 51 is provided in the internal space of the pump case 48. The pump body 51 is constituted of a micro pump of a diaphragm type, and includes a piezoelectric element 43a and a diaphragm 47.

The diaphragm 47 and a wall portion of the pump case 48 form an oil chamber 43b. Lubricating oil from the tank 42 flows into the oil chamber 43b to be stored. A nozzle 50 in the shape of a hole that penetrates a wall portion 49 of the pump case 48 on the bearing portion 20 side is formed in the wall portion 49 along the axial direction. The nozzle 50 communicates between the oil chamber 43b and the outside of the pump case 48. The inside diameter of the nozzle 50 is ten micrometers or so to several tens of micrometers, e.g. 25 μm.

The pump body 51 drives the piezoelectric element 43a to reciprocally deform the diaphragm 47 to vary the capacity of the oil chamber 43b. When the capacity of the oil chamber 43b is decreased, a compression force acts on lubricating oil in the oil chamber 43b. With the compression force turned into a discharge force, the lubricating oil flies from the nozzle 50 toward the annular space 11 of the bearing portion 20 as a minute amount of oil droplets P to be supplied to the annular space 11 (see FIG. 1). In other words, lubricating oil is discharged from the nozzle 50 as the oil droplets P at an initial velocity.

The amount of lubricating oil discharged from the oil chamber 43b in one operation of the piezoelectric element 43a is a minute amount (e.g. 50 nL). Therefore, the piezoelectric element 43a of the pump body 51 is caused to operate a plurality of times for one oil supply operation. That is, the piezoelectric element 43a is caused to pulse for one oil supply operation. Each time lubricating oil is discharged from the oil chamber 43b, the oil chamber 43b is automatically replenished with lubricating oil from the tank 42.

The power source portion 45 (see FIG. 2) supplies power for the pump 43 to operate. The control portion 44 can control the timing for the pump 43 to operate. The power source portion 45 may be used to supply power to a detection portion 60 to be described next. The control portion 44 may be used to control the detection portion 60.

The oil supply unit 40 further includes the detection portion 60. The detection portion 60 detects gathering (accumulation in a drop-like form) of lubricating oil around a discharge port 50a. For example, when lubricating oil is discharged from the discharge port 50a of the nozzle 50 by the pump 43, a part of the lubricating oil is caused to fly as the oil droplets P. However, the remainder occasionally adheres to the vicinity of the discharge port 50a, because of the surface tension, to be gathered gradually. The lubricating oil which has been gathered acts to block the discharge port 50a, which obstructs flight of lubricating oil toward the bearing portion 20. That is, the discharge port 50a is clogged. Therefore, lubricating oil is gathered around the discharge port 50a more easily, which makes it difficult to supply oil with lubricating oil unable to fly. That is, a discharge abnormality is caused when lubricating oil is gathered at the discharge port 50a. The detection portion 60 detects a discharge abnormality by detecting gathering of lubricating oil at the discharge port 50a.

Figure 3:
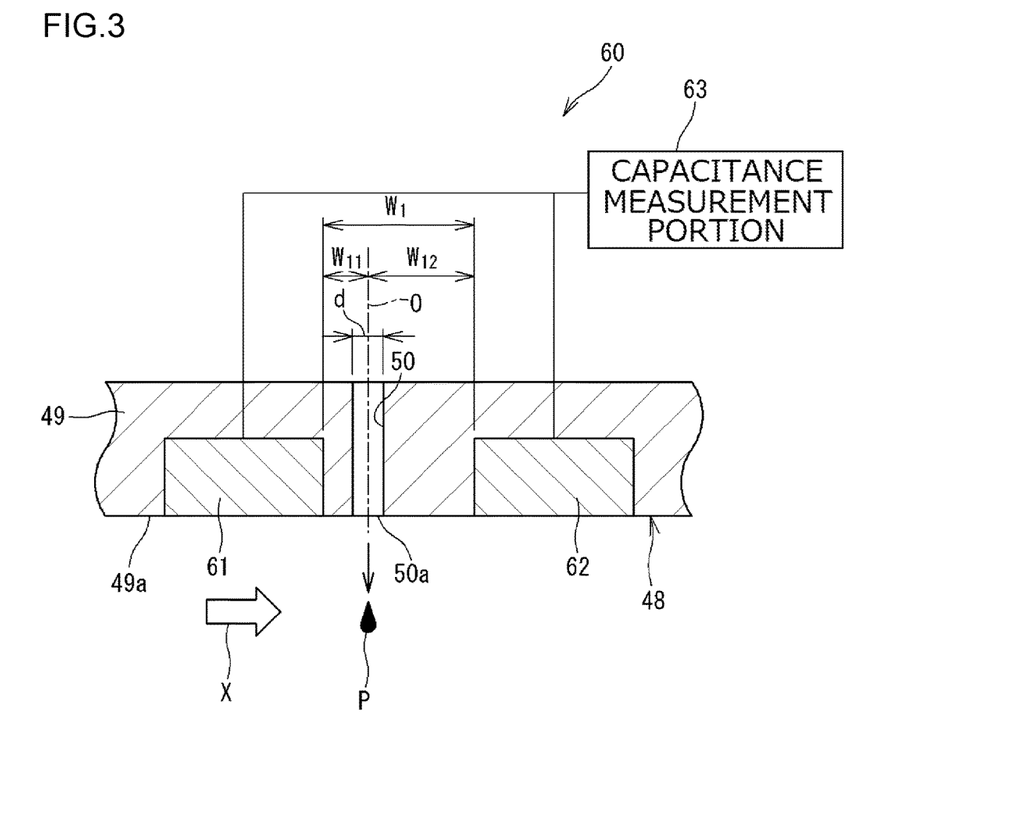
FIG. 3 is a sectional view illustrating the vicinity of a discharge port of a nozzle of the oil supply unit as enlarged.

FIG. 3 is a sectional view illustrating the vicinity of the discharge port 50a of the nozzle 50 of the oil supply unit 40 as enlarged. The right-left direction in FIG. 3 indicates the circumferential direction of the bearing portion 20. The arrow X indicates the direction of a flow of air generated along with rotation of the inner ring 21.

The detection portion 60 includes a pair of electrodes 61 and 62 and a capacitance measurement portion 63. The pair of electrodes 61 and 62 are provided in the wall portion 49 of the pump case 48 on the bearing portion 20 side. The pair of electrodes 61 and 62 are disposed with a clearance from each other in the circumferential direction with the discharge port 50a of the nozzle 50 interposed therebetween. A clearance $w_1$ between the pair of electrodes 61 and 62 is several millimeters, e.g. two millimeters, and is larger than an inside diameter d of the nozzle 50.

The pair of electrodes 61 and 62 are disposed so as to be flush with an outer surface 49a of the wall portion 49 of the pump case 48 in which the discharge port 50a of the nozzle 50 opens. One of the electrodes, 61, positioned on the upstream side in the air flow direction X is disposed closer to the discharge port 50a of the nozzle 50 than the other electrode 62 positioned on the downstream side in the same direction. Specifically, when the distance from a center O of the nozzle 50 to the one electrode 61 is defined as $w_{11}$ and the distance from the center O to the other electrode 62 is defined as $w_{12}$, the relationship $w_{11} < w_{12}$ is met.

The capacitance measurement portion 63 measures the capacitance of the pair of electrodes 61 and 62. The capacitance of the pair of electrodes 61 and 62 is varied as the dielectric constant between the electrodes 61 and 62 is varied. The detection portion 60 detects variations in the capacitance of the pair of electrodes 61 and 62, that is, variations in the dielectric constant therebetween, by the capacitance measurement portion 63 measuring the capacitance.

Figure 4A:
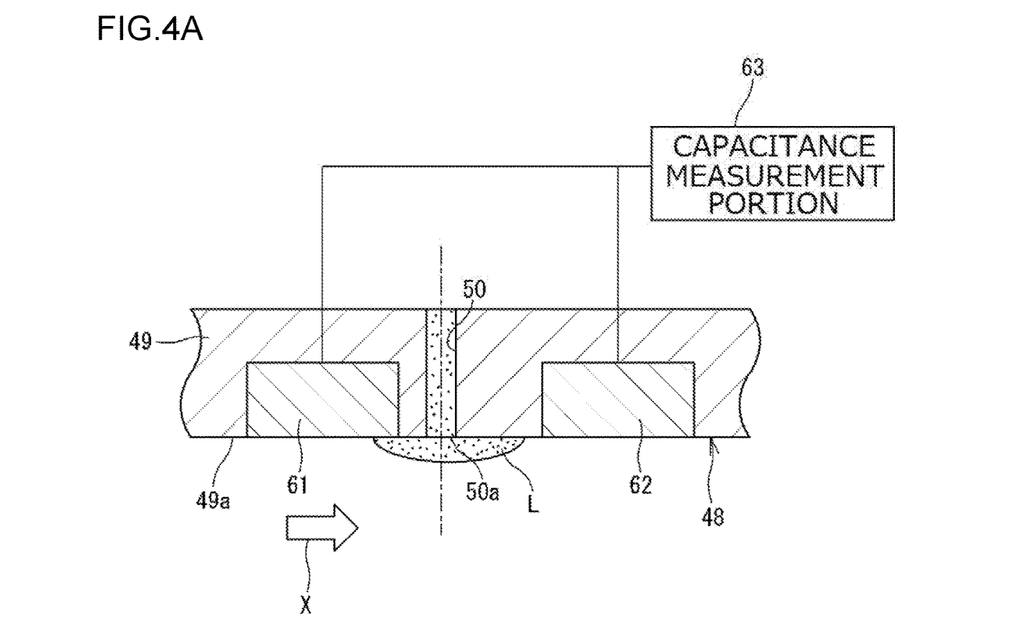
FIGS. 4A and 4B are sectional views illustrating how lubricating oil is gathered around the discharge port of the nozzle.
Figure 4B:
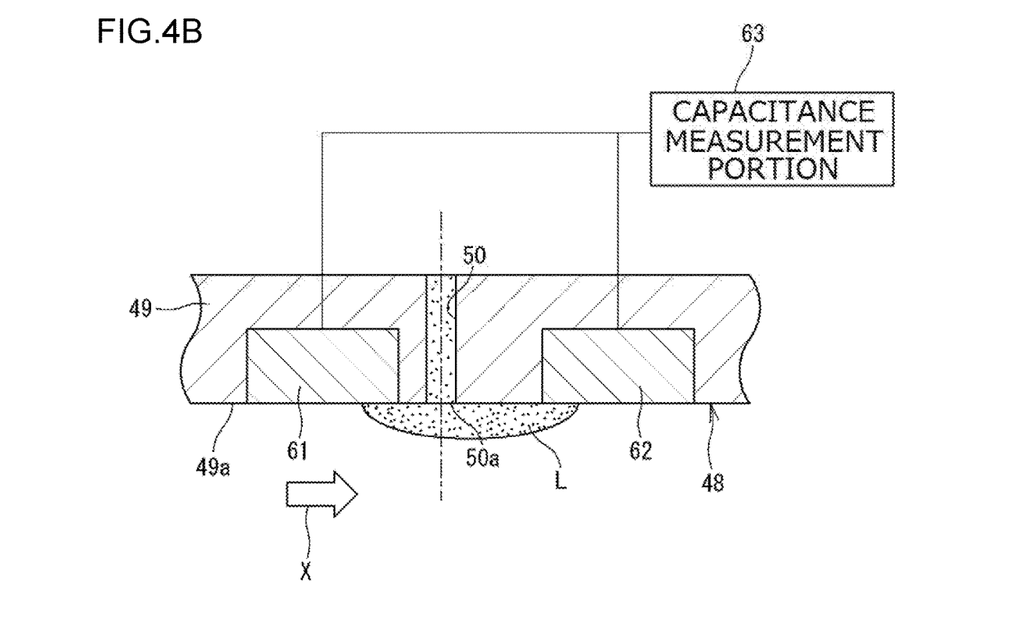

When the nozzle 50 of the pump is clogged etc. and lubricating oil L is gathered (accumulated in a drop-like form) at the discharge port 50a as illustrated in FIGS. 4A and 4B, the dielectric constant between the pair of electrodes 61 and 62 is varied. The dielectric constant is also varied between the case where the amount of the lubricating oil L which is gathered at the discharge port 50a is small (see FIG. 4A) and the case where the amount of the lubricating oil L which is gathered at the discharge port 50a is large (see FIG. 4B). In particular, the lubricating oil L can reach the pair of electrodes 61 and 62 to extend between the electrodes 61 and 62 (so that the electrodes 61 and 62 are connected to each other through the lubricating oil L) as illustrated in FIG. 4B. Therefore, the dielectric constant is varied conspicuously compared to the case where there is only air between the pair of electrodes 61 and 62 as illustrated in FIG. 3.

Thus, the detection portion 60 can detect the lubricating oil L which is gathered at the discharge port 50a of the nozzle 50 from variations in the capacitance which is measured by the capacitance measurement portion 63. It is possible to detect occurrence of a discharge abnormality due to clogging of the nozzle 50 etc. on the basis of the detection results. A determination as to whether or not there occurs a discharge abnormality can be made by the control portion 44, for example, on the basis of a comparison between the capacitance which is measured by the capacitance measurement portion 63 and a predetermined threshold.

In order to detect gathering of the lubricating oil L at the discharge port 50a of the nozzle 50, a certain amount of the lubricating oil L is necessary. Therefore, the clearance $w_1$ between the pair of electrodes 61 and 62 is determined to be sufficiently larger than the inside diameter d of the nozzle 50 which is very small. The cause of gathering of the lubricating oil L at the discharge port 50a of the nozzle 50 is considered to include a fact that the discharge force is weakened by an increase in the flow resistance due to residence of foreign matter in the nozzle 50 or adhesion of foreign matter to the nozzle 50, a reduction in the pump performance, or the like. However, such a factor is not limiting.

One of the electrodes 61 and 62 disposed on the upstream side in the air flow direction X is disposed closer to the discharge port 50a of the nozzle 50 than the other disposed on the downstream side. The lubricating oil L which is gathered at the discharge port 50a of the nozzle 50 is easily spread in the direction of the arrow X because of the air flow, but is not easily spread in the opposite direction. Therefore, the lubricating oil L can be caused to easily reach the one electrode 61, which is positioned on the upstream side in the flow direction X, by providing the electrode 61 closer to the discharge port 50a, and the lubricating oil L can also be caused to easily reach the other electrode 62, which is positioned on the downstream side in the flow direction X, by the flow of air. Thus, the lubricating oil L can reach both the electrodes 61 and 62 early to extend between the electrodes 61 and 62. Thus, it is possible to detect gathering of lubricating oil L at the discharge port 50a of the nozzle 50 earlier.

The pair of electrodes 61 and 62 are disposed so as to be flush with a surface in which the discharge port 50a of the nozzle 50 is formed, that is, the outer surface 49a of the wall portion 49 of the pump case 48. Consequently, the flow of air is not hindered by the pair of electrodes 61 and 62, and the flow of air exerts a large effect on the lubricating oil L which is gathered at the discharge port 50a of the nozzle 50. Therefore, the lubricating oil L also reaches the other electrode 62, which is farther from the nozzle 50, early.

Figure 5:
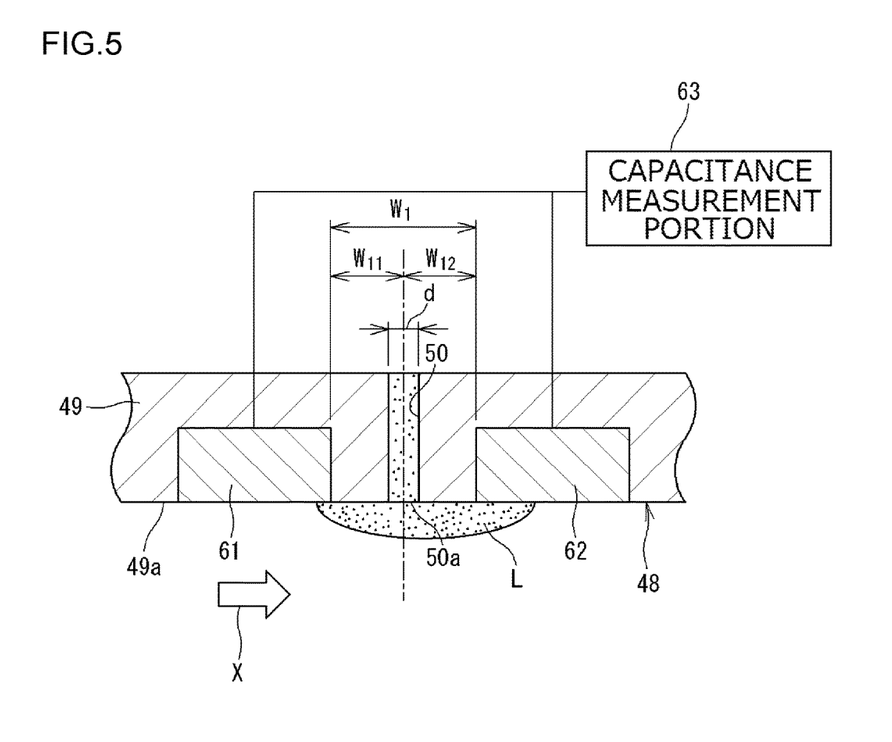
FIG. 5 is a sectional view illustrating the vicinity of a discharge port of a nozzle of an oil supply unit according to a modification as enlarged.

The pair of electrodes 61 and 62 in the oil supply unit 40 according to modifications will be described below. In a modification illustrated in FIG. 5, the pair of electrodes 61 and 62 are disposed at an equal distance from the discharge port 50a of the nozzle 50 ($w_{11} = w_{12}$). The modification is otherwise the same in configuration as the embodiment, and achieves generally the same function and effect as those of the embodiment. It should be noted, however, that the lubricating oil L which is gathered at the discharge port 50a of the nozzle 50 is not easily spread toward the upstream side in the air flow direction X. Therefore, it takes time before the lubricating oil L reaches the electrode 61 on the upstream side in this modification. Therefore, it takes time before gathering of the lubricating oil L can be clearly detected with the lubricating oil L extending between the electrodes 61 and 62, compared to the embodiment. Thus, the embodiment is more advantageous in this respect.

Figure 6:
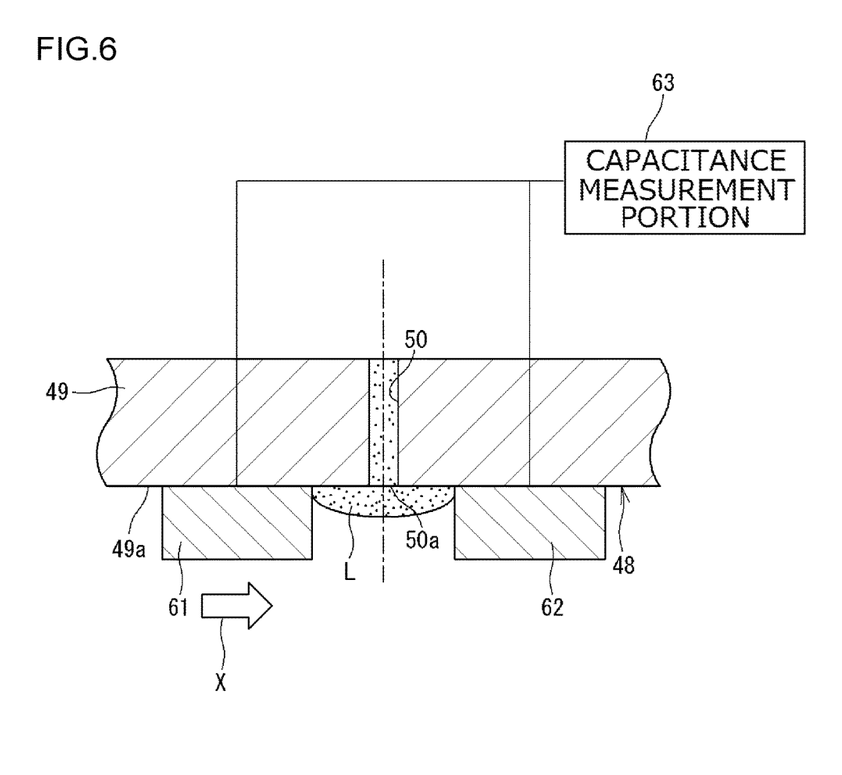
FIG. 6 is a sectional view illustrating the vicinity of a discharge port of a nozzle of an oil supply unit according to another modification as enlarged.

In a modification illustrated in FIG. 6, the pair of electrodes 61 and 62 are provided so as to project toward the bearing portion 20 with respect to a surface in which the discharge port 50a of the nozzle 50 is formed (the outer surface 49a of the wall portion 49). The pair of electrodes 61 and 62 are disposed at an equal distance from the discharge port 50a of the nozzle 50. The modification is otherwise the same in configuration as the embodiment. In this modification, the electrodes 61 and 62 project with respect to the outer surface 49a of the wall portion 49. Therefore, there is less effect of the flow of air, and lubricating oil L can reach both electrodes 61 and 62 generally as easily even if the electrodes 61 and 62 are provided with an equal clearance from the nozzle 50.

In this modification, the pair of electrodes 61 and 62 project toward the bearing portion 20, and therefore it is difficult to provide the nozzle 50 close to the bearing portion 20. Therefore, lubricating oil L flies over a long distance from the nozzle 50 toward the annular space 11. In the embodiment, in this respect, the discharge port 50a of the nozzle 50 and the electrodes 61 and 62 are disposed so as to be flush with each other. Consequently, the nozzle 50 can be provided as close as possible to the bearing portion 20, and lubricating oil L flies over a short distance. Therefore, the discharge force of the pump body 51 can advantageously be made as small as possible.

The embodiment and the modifications are exemplary in all respects, and not limiting. That is, the rolling bearing device according to the present invention is not limited to the illustrated embodiment, and may be in other embodiments without departing from the scope of the present invention. For example, in the embodiment, the bearing portion 20 is an angular contact ball bearing. However, the type of the bearing is not limited thereto, and may be a deep-groove ball bearing, or may be a tapered rolling bearing or a cylindrical roller bearing. The rolling bearing device 10 may be used for usage other than a main spindle of a machine tool. In the bearing portion 20, the inner ring 21 may be a stationary ring, and the outer ring 22 may be a rotary ring.

With the present invention, it is possible to detect gathering of lubricating oil at a discharge port of a nozzle due to clogging etc.

What is claimed is:

1. A rolling bearing device comprising:
   a bearing portion that has an inner ring, an outer ring, and a plurality of rolling elements interposed between the inner ring and the outer ring; and
   an oil supply unit provided adjacent, in an axial direction, to an annular space between the inner ring and the outer ring to supply lubricating oil to the annular space, wherein:
   the oil supply unit includes an oil chamber that accommodates lubricating oil, a nozzle that discharges lubricating oil in the oil chamber, a pump body that applies a discharge force for causing lubricating oil in the oil chamber to fly from the nozzle toward the annular space, and a detection portion that detects gathering of oil at a discharge port of the nozzle; and
   the detection portion includes a pair of electrodes disposed with the discharge port of the nozzle interposed therebetween, and a measurement portion that measures a capacitance of the pair of electrodes.

2. The rolling bearing device according to claim 1, wherein
   the pair of electrodes are disposed with a clearance from each other in a direction of a flow of air caused by rotation of the inner ring or the outer ring with the nozzle interposed therebetween, and one of the electrodes positioned on an upstream side in the air flow direction is disposed closer to the discharge port of the nozzle than the other electrode positioned on a downstream side in the same direction.

3. The rolling bearing device according to claim 1, wherein
   the pair of electrodes are disposed so as to be flush with a surface in which the discharge port of the nozzle is formed.

4. The rolling bearing device according to claim 2, wherein
   the pair of electrodes are disposed so as to be flush with a surface in which the discharge port of the nozzle is formed.

* * * * *